United States Patent Office
3,518,277
Patented June 30, 1970

3,518,277
2-β-DILOWERALKYLAMINOPROPIONYL-
1-PHENYL-1,2,3,4-TETRAHYDROBEN-
ZOTHIENO[2,3-C]PYRIDINES
John T. Suh, Mequon, Wis., assignor to Colgate-Palmolive Company, New York, N.Y., a corporation of Delaware
No Drawing. Continuation-in-part of application Ser. No. 621,437, Mar. 8, 1967. This application Feb. 16, 1968, Ser. No. 705,892
Int. Cl. C07d 63/18
U.S. Cl. 260—294.8                    2 Claims

ABSTRACT OF THE DISCLOSURE

The compounds are 2-β-diloweralkylaminopropionyl-1-phenyl-1,2,3,4-tetrahydrobenzothieno[2,3-C]pyridines, useful as antihypertensive agents and central nervous system stimulants. A compound disclosed is 2-β-diethylaminopropionyl-1-phenyl-1,2,3,4-tetrahydrobenzothieno-[2,3-C]pyridines.

RELATED APPLICATION

This application is a continuation-in-part of my co-pending application Ser. No. 621,437 filed Mar. 8, 1967.

SUMMARY OF THE INVENTION

The present invention relates to novel derivatives of 1,2,3,4-tetrahydrobenzothieno[2,3-C]pyridines, methods of preparing such compounds, pharmaceutical compositions containing them and therapeutic methods employing them.

DETAILED DESCRIPTION

The compounds of the present invention have the following formula:

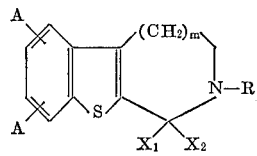

wherein $m$ is 1 and R is

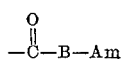
—C—B—Am

B is an alkylene of 1 to 6 carbon atoms, A$m$ is

in which $R_2$ and $R_3$ may be the same or different groups selected from hydrogen or, lower alkyl of 1 to 4 carbon atoms, $X_1$ is hydrogen and $X_2$ is phenyl.

The basic starting materials employed in the preparation of the compounds of the present invention are β-(3-thianaphthenyl)alkylamines of the formula

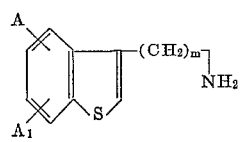

These amines may be prepared from the corresponding cyano compounds as described in the literature. [Herz J.A.C.S. 72, p. 4999 (1950)].

The starting materials may also be prepared by treating the corresponding acid with thionyl chloride followed by treatment with sodium azide and acid hydrolysis. The process may be illustrated as follows:

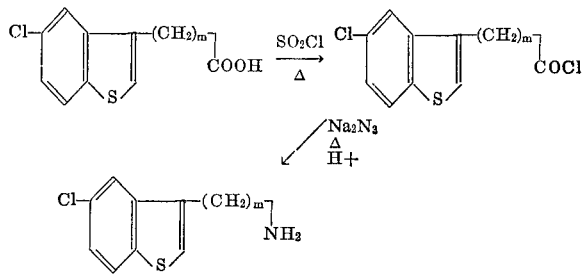

Representative of the amines which may be employed are the following:

β-(3-thianaphthenyl)ethylamine,
β(5-chloro-3-thianaphthenyl)ethylamine,
β-(5-hydroxy-3-thianaphthenyl)ethylamine,
β-(6-trifluoromethyl-3-thianaphthenyl)ethylamine,
β-(7-methoxy-3-thianaphthenyl)ethylamine,
β(4-bromo-3-thianaphthenyl)ethylamine, and
γ-(3-thianaphthenyl)propylamine.

The compounds of the present invention which are represented by the formula

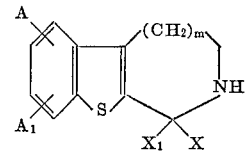

wherein $X_1$ is hydrogen may be prepared by treating a β-(3-thianaphthenyl)ethylamine with a suitable aldehyde in a concentrated liquid organic acid such as glacial acetic acid.

The above described process may be diagrammed as follows:

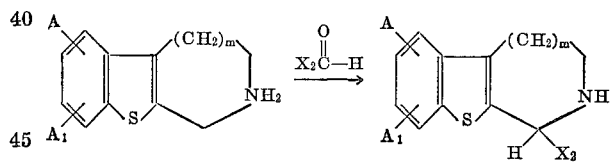

wherein A and $A_1$ are as described and do not interfere with or partake in the reaction.

Representative of the aldehydes which may be employed in the described process are the following:
Benzaldehyde and p-methoxybenzaldehyde.

Representative of the compounds which may be prepared by the described process are the following:
1-(p-chlorophenyl)-1,2,3,4-tetrahydrobenzothieno[2,3-C]pyridine, and
1-phenyl-1,2,3,4-tetrahydrobenzothieno[2,3-C]pyridine.

The compounds of the present invention which are represented by the formula

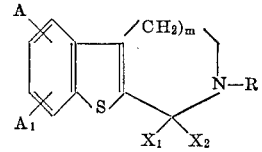

in which R is

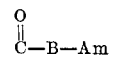
—C—B—Am are conveniently prepared by treating a corresponding unsubstituted compound with an amino-acyl halide to form the corresponding derivative.

The described process may be illustrated as follows:

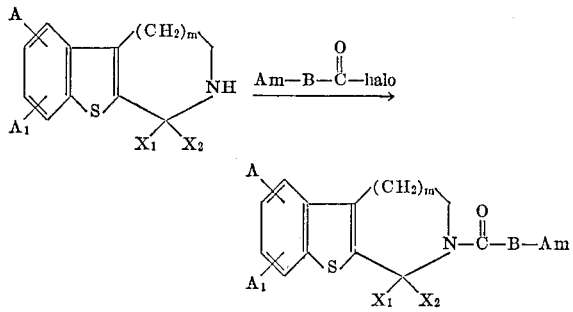

where A and $A_1$ are as described and do not interfere with or partake in the reaction.

Representative of the aminoacyl halides which may be used in the above described process are the following:

3-(diethylamino)propionyl halide,
2-(dimethylamino)acetyl halide,
3-(N-benzyl-N-methylamino)propionyl bromide,
2-(N,N-dibenzylamino)acetyl chloride and,
3-(N-phenyl-N-methylamino)propionyl bromide.

Representative of the compounds which may be prepared in the described manner are the following:

2 - β - diethylaminopropionyl - 1 - phenyl - 1,2,3,4-tetrahydrobenzothieno[2,3-C]pyridine and, 2 - dimethylaminoacetyl - 1 - phenyl - 1,2,3,4 - tetrahydrobenzothieno[2,3-C]pyridine.

The compounds in which R is aminoacyl may also be prepared by first treating the corresponding unsubstituted compound with acrylic halide, followed by treatment with an amine.

The described process may be illustrated as follows:

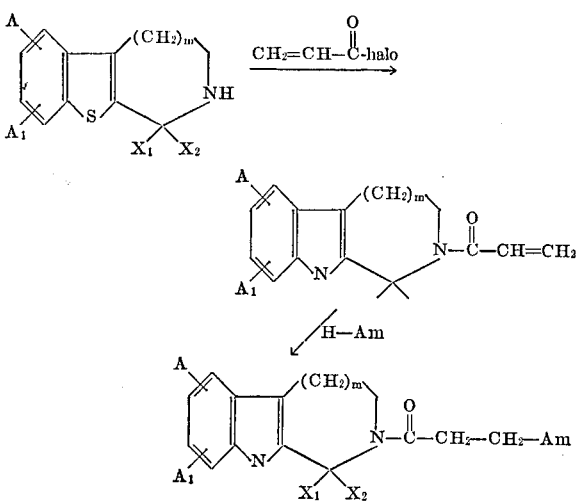

wherein X, $X_1$, A and A are as described and do not partake in or interfere with the reaction.

The above described process provides a convenient means of preparing those compounds which might not be conveniently prepared by the use of aminoacyl halides because of their commercial unavailability.

The novel compounds of the present invention may be used as intermediates in the preparation of more complex chemical and pharmaceutical compounds and because of their antiserotonin activity as valuable pharmacological tools. In addition, they are useful as pharmaceutical agents, per se, because of their antihypertensive and antipsychotic properties, especially their ability to control antisocial aggressive behavior when administered to animals. To illustrate, the compounds 2-β-diethylaminopropionyl-1-phenyl - 1,2,3,4-tetrahydrobenzothieno[2,3-C]pyridine, 2-amidino - 1 - methyl-1,2,3,4-tetrahydrobenzothieno[2,3-C]pyridine and 2-amidino-1,2,3,4-tetrahydrobenzothieno[2,3-C]pyridine are effective in decreasing the aggressiveness and viciousness and persistence of fighting among one-half of the isolated mice receiving 20 mg./kg. intraperitoneally. Agents which have the ability to control antisocial behavior, of course, are useful in both medicinal and veterinary practice.

The following compounds were found to be effective in lowering blood pressure when administered in 3.0 and 10.0 mg./kg. intravenous doses to the vagotomized, anesthesized dog preparation, which is a standard animal preparation for testing for antihypertensive activity.

2-amidino-1,2,3,4 - tetrahydrobenzothieno[2,3-C]pyridine,

2-β-diethylaminopropionyl - 1 - phenyl-1,2,3,4-tetrahydrobenzothieno[2,3-C]pyridine, and 2-amidino - 1 - methyl-1,2,3,4-tetrahydrobenzothieno[2,3-C]pyridine.

In animal behavioral screening tests the above-mentioned compounds exhibited a central nervous system stimulant activity. In mice receiving 10 to 30 mg./kg. of the compounds intraperitoneally in the form of a 5% acacia suspension, increased alertness, reactivity, struggle response and other behavioral characteristics of central nervous system stimulation were observed. As a result of the behavioral studies the compounds were found to have $LD_{50}$ values in excess of 50 mg./kg. The behavioral studies were conducted in accordance with the procedure set forth by Irwin in "Animal and Clinical Pharmacologic Techniques in Drug Evaluation," J. H. Nodine and P. E. Siegler, Ed., Year Book Publishers, Inc. 1964, pp. 36–54.

The novel compounds in which R, $X_1$ or $X_2$ is B-Am may also be used to form salts with penicillins. The thus formed salts can then be used to aid in the isolation and purification of the antibiotics.

Acid addition salts of the compounds of the present invention may be conveniently prepared by contacting the compounds which are capable of forming such salts with a suitable acid such as formic acid, citric acid, maleic acid, sulfuric acid, hydrochloric acid, succinic acid, tartaric acid, benzoic acid or fumaric acid.

Quarternary ammonium salts may be formed by contacting the salt forming compounds with a suitable alkylating agent such as dimethyl sulfate, or an alkyl halide such as methyl chloride, methyl iodide or ethyl bromide.

When intended for use as pharmaceutical agents, the compounds are preferably combined with a major amount of one or more suitable pharmaceutical diluents and formed into unit dosage forms. Such dosage forms provide suitable means for oral and parenteral administration.

The pharmaceutical diluents which may be employed may be either liquid or solid, but the preferred liquid carrier is water. In the event the compound is not soluble in water a pharmaceutically acceptable organic solvent such as propylene glycol may be employed.

Solid pharmaceutical diluents such as starch, sugar and talc can be utilized to form powders which can in turn be used as such or may be tableted or encapsulated. In addition to the forementioned material, a wide variety of conventional pharmaceutical lubricants, disintegrating agents, flavoring agents and the like, may also be employed.

The unit dosage forms may contain a concentration of 0.1% to 10% or more by weight of one or more of the novel compounds. Generally, such dosage forms will contain about 5 to 250 mg. of the active ingredients. One or more of such dosage forms may be administered daily. In actual practice, the amount of drug required to produce the desired antipsychotic effect will, of course, vary considerably because of patient differences.

The following examples are presented to illustrate this invention:

EXAMPLE 1

β-(3-thianaphthenyl)ethylamine

To a suspension of 21 g. (0.55 mole) of lithium aluminum hydride in 450 ml. of anhydrous ether is added a solution of 31.7 g. (0.18 mole) of 3-cyanomethylthianaphthene in 350 ml. of anhydrous ether in 45 minutes. The mixture is stirred at room temperature for 3 hours after which the complex is decomposed by the dropwise addition of 80 ml. of water. The solids are removed by filtration and washed with ether. The filtrate is dried and concentrated in vacuo to yield a brown oil which is fractioned to yield β-(3-thianaphthenyl)ethylamine in the form of a clear liquid, B.P. 109–110°/0.3 mm.

Analysis.—Calcd. for $C_{10}H_{11}NS$ (percent): C, 67.75; H, 6.26; N, 7.90. Found (percent): C, 67.49; H, 6.50; N, 7.92.

EXAMPLE 2

N-β-(3-thianaphthenylethyl)acetamide

To 5.6 g. (0.03 mole) of β-(3-thianaphthenyl)ethylamine is added 72 ml. of 20% sodium hydroxide solution with cooling in 10 minutes. Acetic anhydride (20 ml.) is then added dropwise with cooling within 15 minutes, after which the mixture is stirred with cooling for 1 hour and at room temperature for 16 hours. The mixture is extracted three times with 100 ml. portions of ether. The extracts are combined and washed three times with 50 ml. of brine, dried, and concentrated in vacuo to yield a clear liquid which is crystallized from benzene/petroleum-ether to yield N-β-(3-thianaphthenylethyl)acetamide in the form of a white crystalline solid, M.P. 67–68.5°.

Analysis.—Calcd. for $C_{12}H_{13}NoS$ (percent): S, 14.62. Found (percent): S, 14.73.

EXAMPLE 3

1-(p-chlorophenyl) - 1,2,3,4 - tetrahydrobenzothieno[2,3-C]pyridine

A solution of 3.0 g. (0.017 mole) of β - (3 - thianaphthenyl)ethylamine and 3.1 g. (0.022 mole) of p-chlorobenzaldehyde in 10 ml. of glacial acetic acid is heated on a steam bath for 20 minutes after which it is stirred at room temperature overnight. It is then diluted with 75 ml. of water, adjusted to basicity by the addition of potassium carbonate and cooled. The precipitated solids are collected and recrystallized from isopropanol to yield 1-(p-chlorophenyl)-1,2,3,4-tetrahydrobenzothieno[2,3 - C]pyridine in the form of a light textured white crystalline solid, M.P. 57.5–60°.

Analysis.—Calcd. for $C_{17}H_{14}ClNS$ (percent): C, 68.12; H, 4.71; S, 10.69. Found (percent): C, 68.14; H, 4.49; S, 10.84.

EXAMPLE 4

1-phenyl-1,2,3,4-tetrahydrobenzothieno[2,3 - C]pyridine

To a solution of 6.1 g. (0.03 mole) of β-(3-thianaphthenyl)ethylamine in 30 ml. of glacial acetic acid is added 4.9 ml. (5.2 g., 0.05 mole) of benzalde. It is heated on a steam bath for 20 minutes and stirred at room temperature for 16 hours. It is then diluted with 150 ml. of water, neutralized with potassium carbonate and extracted twice with 100 ml. portions of ether. The extracts are combined, washed with 50 ml. of brine, and concentrated to yield a solid which is recrystallized from isopropanol to yield 1-phenyl-1,2,3,4-tetrahydrobenzothieno[2,3 - C]pyridine in the form of a light-green crystalline solid in two crops, M.P. 58–59°.

Analysis.—Calcd. for $C_{17}H_{15}NS$ (percent): C, 76.96; H, 5.69; N, 5.28; S, 12.08. Found (percent): C, 77.11; H, 5.85; N, 5.43; S, 12.26.

EXAMPLE 5

2-β-diethylaminopropionyl - 1 - phenyl-1,2,3,4-tetrahydrobenzothieno[2,3-C]pyridine hydrochloride To a solution of 4.3 g. (0.024 mole) of 3-(diethylamino) propionic acid hydrochloride in 5 ml. of water is added 0.95 g. (0.024 mole) of sodium hydroxide flakes and the mixture is cooled until a clear solution is obtained. Benzene (100 ml.) is added and the mixture concentrated to yield a viscous oil to which 20 ml. of thionyl chloride is added in 5 minutes. The mixture is stirred at room temperature 1.5 hours, heated to 60° and the excess thionyl chloride removed in vacuo after which two 50 ml. portions of benzene are added and successively concentrated. Benzene (100 ml.) and 3.84 g. (0.038 mole, 5.3 ml.) of triethylamine are added to the above mixture. The reaction mixture is cooled to 30° and a solution of 5.0 g. (0.019 mole) of 1-phenyl - 1,2,3,4 - tetrahydrobenzothieno[2,3-C]pyridine in 50 ml. of benzene is added in 5 minutes. It is stirred at room temperature 0.5 hour, heated to 80° for 20 minutes, cooled to room temperature and filtered. The filtrate is concentrated to yield a dark residue which is dissolved in 250 ml. of water and 50 ml. of brine, washed with benzene, ether, and finally filtered. The filtrate is made basic with 10% sodium hydroxide solution and extracted twice with benzene. The combined extract is treated with activated charcoal and concentrated to yield a viscous oil. Petroleum ether (200 ml.) is added to the residue, refluxed for ½ hour and decanted. This procedure is repeated and the combined organic solution concentrated to yield a gold oil which is dissolved in ether and made acidic by the addition of ethereal hydrogen chloride. The solid is collected and recrystallized from a solution of benzene and cyclohexane to yield 2-β-diethylaminopropionyl - 1 - phenyl - 1,2,3,4 - tetrahydrobenzothieno[2,3-C]pyridine hydrochloride in the form of a light grey powder, M.P. 188–189.5°.

Analysis.—Calcd. for $C_{24}H_{29}ClN_2OS$ (percent): C, 67.18; H, 6.82; Cl−, 8.26; N, 6.53. Found (percent): C, 66.97; H, 6.71; Cl−, 8.26; N, 6.36.

I claim:
1. A compound of the formula:

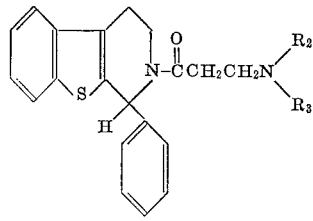

in which $R_2$ and $R_3$ are hydrogen or lower alkyl of 1 to 4 carbon atoms.

2. A compound of claim 1 in which $R_2$ and $R_3$ are ethyl.

No references cited.

ALEX MAZEL, Primary Examiner

J. TOVAR, Assistant Examiner

U.S. Cl. X.R.

424—263

UNITED STATES PATENT OFFICE
CERTIFICATE OF CORRECTION

Patent No. 3,518,277　　　　　　　　Dated July 21, 1970 (Page 1)

Inventor(s) John T. Suh

It is certified that error appears in the above-identified patent and that said Letters Patent are hereby corrected as shown below:

Column 2, line 25 to 32 -"                                                   "

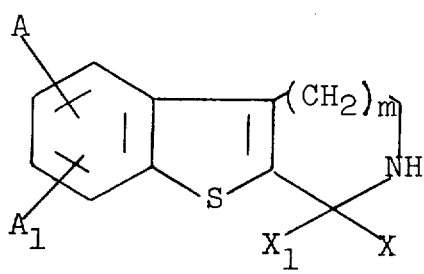

should read --

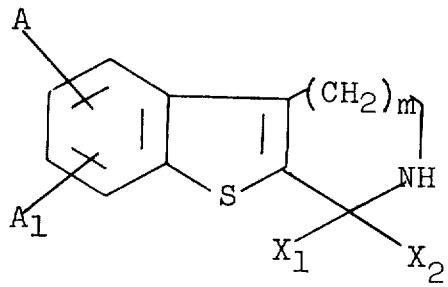

--

Column 2, line 40 to 45 - "                                                  "

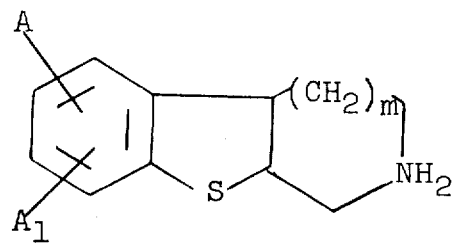

should read --

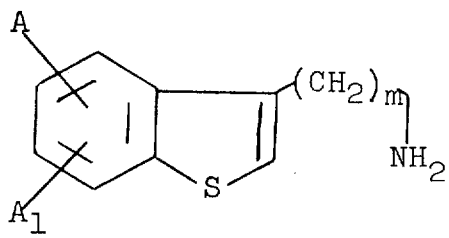

--

PO-1050
(5/69)

UNITED STATES PATENT OFFICE
CERTIFICATE OF CORRECTION

Patent No. 3,518,277    Dated July 21, 1970 (Page 2)

Inventor(s) John T. Suh

It is certified that error appears in the above-identified patent and that said Letters Patent are hereby corrected as shown below:

Column 3, line 47 to 55 - "

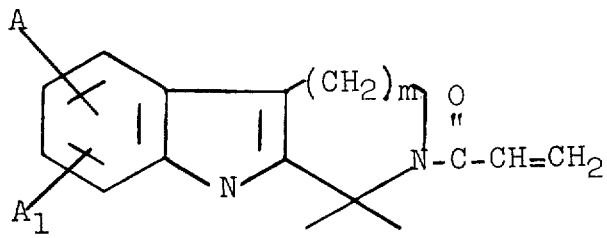

should read --

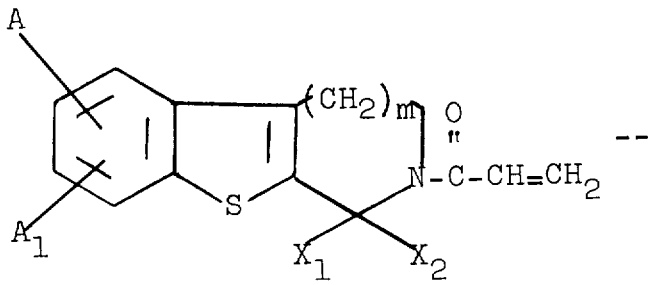

--

Column 5, line 64 - "benzalde" should read -- benzaldehyde --.

SIGNED AND
SEALED
OCT 27 1970

(SEAL)
Attest:

Edward M. Fletcher, Jr.
Attesting Officer

WILLIAM E. SCHUYLER, JR.
Commissioner of Patents